March 24, 1959

W. S. FINKEN 2,879,343

MICROPHONE SUPPORT

Filed Aug. 17, 1955

*INVENTOR.*
WALTER S. FINKEN

BY *Robert S. Dunham*

ATTORNEY

United States Patent Office 2,879,343
Patented Mar. 24, 1959

2,879,343

MICROPHONE SUPPORT

Walter S. Finken, Brooklyn, N.Y., assignor to Leonard P. Frieder, Great Neck, N.Y.

Application August 17, 1955, Serial No. 529,060

6 Claims. (Cl. 179—156)

This invention relates to a support for a microphone or similar device, by which the microphone may be quickly and readily moved between an active position of use and a retracted position where it is enclosed within a housing. The invention is particularly concerned with apparatus for supporting a microphone on a safety headgear, such as are used by aircraft pilots and others engaged in hazardous occupations.

Personnel in military aircraft, particularly one of the jet propelled fighter type, are often required to wear safety helmets. While wearing such helmets, they are at times required to use a microphone for communication by radio. However, the microphone is only necessary for relatively short intervals which may be spaced apart substantially.

An object of the present invention is to provide a support for mounting a microphone on a safety helmet, so that the microphone may be shifted between a retracted position where it is recessed within the helmet and an active position where it is located immediately in front of the lips of the wearer.

Another object of the invention is to provide an improved retractable support for a microphone device.

Another object is to provide an improved retractable support for a microphone to be moved between an active position and a retracted position.

The foregoing objects are attained, in the structure described herein, by fixing the microphone on the free ends of two elongated tubes which are formed of flexible, deformable material. Since the tubes are readily deformable they conform easily to the shape of the helmet shell when they are retracted inside it. Furthermore, they may be readily bent to position the microphone in front of the wearer's lips when he pulls it out for use.

An improved carriage and track structure is provided within the helmet shell for supporting the flexible tubes. Two carriage elements are attached to the tubes at spaced positions. Each carriage element holds the tubes in a parallel relationship, and also retains a ball on which the carriage rolls. The track structure comprises a pair of facing channel sections, each having a central groove in which the balls of the two carriages roll.

Other objects and advantages of the invention will become apparent from a consideration of the following description and claims, taken together with the accompanying drawing.

Figure 1:
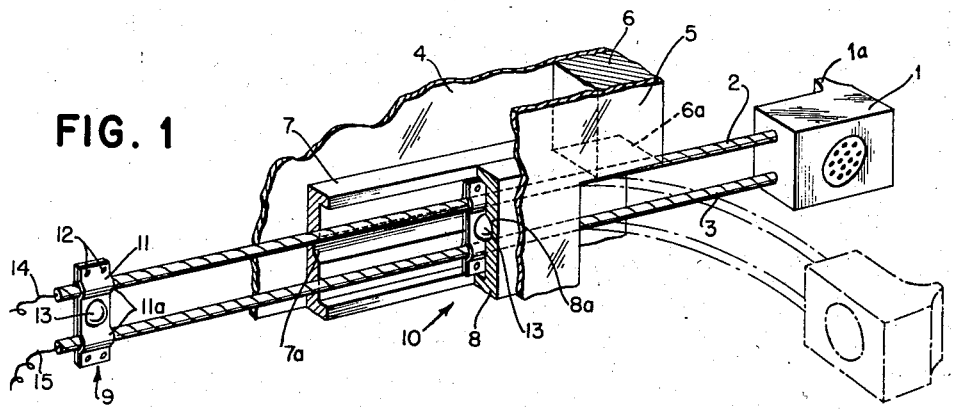
Fig. 1 is a fragmentary view of a safety helmet shell, showing generally in perspective with certain parts broken away and others shown in section, illustrating a mounting for a lip microphone in accordance with the invention.
Figure 4:
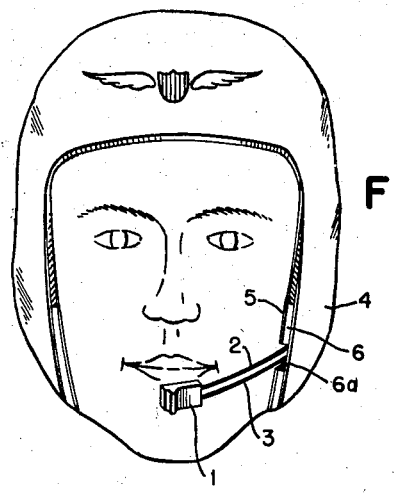
Fig. 4 is a front elevational view of a person wearing a headgear equipped with a lip microphone mounting in accordance with the invention.

Referring to the drawing, there is shown a microphone 1 fixed on the free ends of a pair of elongated flexible tubes 2 and 3. A portion of a helmet shell or outer wall is shown at 4. The particular helmet structure disclosed also has an inner wall 5. Between the two walls is mounted a block 6 of resilient material, which may be cork, sponge rubber, or the like. The block 6 is cut away, as shown at 6a (see Figs. 1 and 4) to provide a recess for receiving the microphone 1.

In back of the recess 6a, between the helmet shells 4 and 5, there are mounted a pair of facing channel sections 7 and 8. These channel sections may be of relatively hard rubber or any other suitable light, wear-resistant material. The tubes 2 and 3 extend into the facing channels of the sections 7 and 8. Within those channels there are fixed on the tubes 2 and 3, two carriages 9 and 10, which are spaced some distance apart along the length of the tubes. Each of the carriages 9 and 10 comprises two generally flat plates 11 having facing semi-cylindrical recesses 11a for receiving the tubes 2 and 3. The plates 11 are held together by any suitable means, such as rivets 12.

The carriages are apertured to receive a roller 13, which may be either a cylindrical roller or a ball 13. These apertures are preferably located in the central portion of the carriages 9 and 10 between the tubes 2 and 3, but alternatively may be located at the ends of the carriages, adjacent the rivets 12. Portions of the material of the plates 11 may be bent outwardly to provide a retainer for the ball 13. The balls 13 are preferably slightly smaller in diameter than the distance between the bottoms of the grooves 7a and 8a formed in the channel sections 7 and 8, so that each ball rolls in one groove only at any given time and there is therefore no sliding friction between the ball and either groove.

The carriages 9 and 10, the channel sections 7 and 8, and rollers 13 cooperate to prevent excessive friction between the tubes 2 and 3 and the helmet shell. They also prevent the ends of the tubes from scoring the inner surface of the helmet shell.

Figure 2:
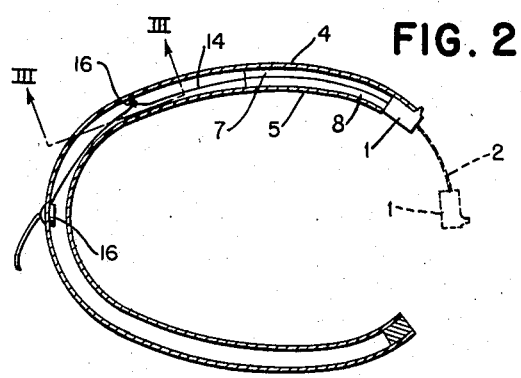
Fig. 2 is a somewhat diagrammatic horizontal cross-sectional view through the helmet shell of Fig. 1, showing the microphone mounting.
Figure 3:
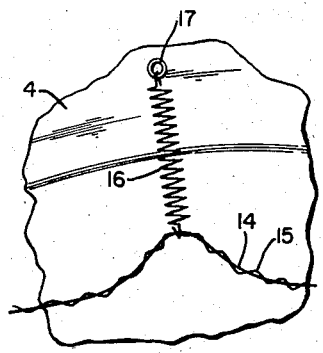
Fig. 3 is an enlarged fragmentary sectional view taken on the line III—III of Fig. 2, showing a detail of the microphone mounting.

The retracted position of the microphone 1 is shown in full lines in Fig. 2 and the active or use position is shown in dotted lines. When the microphone is first pulled out of the recess 6a, by means of the finger grip 1a, it may tend to move straight out of the recess in a direction tangential to the curvature of the helmet shell, to the position shown in full lines in Fig. 1. It may then be moved from that position by simply bending the tubes 2 and 3, to the use position shown in dotted lines in Figs. 1 and 2 and in full lines in Fig. 4.

The tubes 2 and 3 are hollow. A pair of electrical lead wires 14 and 15 extend through the tubes 2 and 3 to the microphone 1. From the rear ends of the tubes 2 and 3, the lead wires 14 and 15 extend to a binding post 16 mounted in back of the helmet, as shown in Fig. 2. When the microphone is in its retracted position, there is a considerable slack in the lead wires 14 and 15 between the ends of the tubes 2 and 3 and the binding post 16. This slack may be taken up by spring 16 so as to maintain the lead wires under light tension, and to avoid the possibility of kinking of the lead wires while the microphone is retracted. Such kinking might make it difficult to pull the microphone out to its position of use. The spring 16 has one end fastened, as by a rivet 17, to the shell 4. The free end of spring 16 is attached to the pair of lead wires 14 and 15.

Although the headgear illustrated is shown as a double walled arrangement, it will be readily understood by those skilled in the art that the invention is equally applicable to a helmet having only a single rigid outer wall. For example, the helmet may be of the type illustrated in the copending application of Leonard P. Frieder and Walter S. Finken, Serial No. 201,904, filed December 21, 1950.

While I have shown and described only one preferred embodiment of the invention, other modifications thereof will readily occur to those skilled in the art and I therefore intend my invention to be limited only by the appended claims.

I claim:

1. Microphone support apparatus comprising a microphone, a safety helmet structure including means defining a recess adjacent the cheek of the wearer to receive the microphone when retracted, a pair of tubes of flexible, deformable material, attached at one end to said microphone, carriage means for movably supporting said tubes, means in said carriage means for holding said two tubes parallel, and track means attached to said helmet for guiding said carriage means, said microphone being shiftable manually from said retracted position to an active position by pulling the microphone from its retracted position and bending said tubes to bring it adjacent the lips of the wearer.

2. Microphone support apparatus comprising a microphone, a safety helmet structure including means defining a recess adjacent the cheek of the wearer to receive the microphone when retracted, a pair of tubes of flexible, deformable material attached at one end to said microphone, carriage means for movably supporting said tubes, track means attached to said helmet for guiding said carriage means, a symmetrically round body caged in said carriage means for free rotation therein and opposed channel sections grooved in said track means to receive said symmetrically round body, said microphone being shiftable manually from said retracted position to an active position by pulling the microphone from its retracted position and bending said tubes to bring it adjacent the lips of the wearer.

3. Microphone support apparatus comprising a microphone, a safety helmet structure including means defining a recess adjacent the cheek of the wearer to receive the microphone when retracted, a pair of tubes of flexible, deformable material attached at one end to said microphone, lead wires for said microphone extending through said tubes, carriage means for movably supporting said tubes, and track means attached to said helmet for guiding said carriage means, said microphone being shiftable manually from said retracted position to an active position by pulling the microphone from its retracted position and bending said tube to bring it adjacent the lips of the wearer.

4. Microphone support apparatus comprising a microphone, a safety helmet structure including means defining a recess adjacent the cheek of the wearer to receive the microphone when retracted, a pair of tubes of flexible deformable material attached at one end to said microphone, lead wires for said microphone extending through said tubes, carriage means for movably supporting said tubes, track means attached to said helmet for guiding said carriage means, and means in said helmet for taking up the slack in said lead wires, said microphone being shiftable manually from said retracted position to an active position by pulling the microphone from its retracted position and bending said tubes to bring it adjacent the lips of the wearer.

5. Microphone support apparatus comprising a microphone, a safety helmet structure including means defining a recess adjacent the cheek of the wearer to receive the microphone when retracted, a pair of elongated tubes of flexible, deformable material, both attached at one end to said microphone, at least two spaced carriages for supporting said tubes in parallel spaced relation; each carriage comprising two plates, each plate having a pair of parallel semi-cylindrical recesses, means fastening said plates together with said recesses facing and cooperating to define cylindrical apertures to receive said tubes, a roller retained by said plates in an aperture located between said parallel cylindrical apertures; track means for guiding said carriages, including a pair of channel members attached to said helmet, with their open sides facing and having grooves at the centers of the channels for receiving said rollers, lead wires for said microphone extending therefrom through said tubes and out the opposite end thereof to a terminal fixed on said shell, said wires including slack portions when said microphone is retracted, and slack take-up means in said helmet for holding the slack portions under tension, said microphone being shiftable manually from said retracted position to an active position by pulling the microphone from its active position and bending said tubes to bring it adjacent the lips of the wearer.

6. Microphone support apparatus comprising a microphone, an article of apparel including means defining a recess to receive the microphone when retracted, at least one elongated tube of flexible, deformable material, attached at one end to said microphone, carriage means for movably supporting said tube, track means attached to said article for guiding said carriage means, said microphone being shiftable manually from said retracted position to an active position by pulling the microphone from its retracted position and bending said tubes to bring it adjacent the lips of the wearer.

References Cited in the file of this patent

UNITED STATES PATENTS

| 2,428,746 | Veneklasen | Oct. 7, 1947 |
| 2,481,271 | Willey | Sept. 6, 1949 |
| 2,503,846 | Shann | Apr. 11, 1950 |